United States Patent
Aschauer

Patent Number: 5,931,157
Date of Patent: Aug. 3, 1999

[54] THERMAL INSULATION/THERMAL COLLECTOR ASSEMBLY

[76] Inventor: Johann Aschauer, Unterdörfl 49, A-4362 Bad Kreuzen, Austria

[21] Appl. No.: 08/700,725

[22] Filed: Jul. 29, 1996

Related U.S. Application Data

[63] Continuation-in-part of application No. PCT/EP95/00295, Jan. 27, 1995.

[30] Foreign Application Priority Data

Jan. 28, 1994 [DE] Germany .......................... 94 01 452 U

[51] Int. Cl.$^6$ ........................................................ F24J 2/46
[52] U.S. Cl. ........................ 126/650; 126/621; 126/622; 126/634; 126/648; 126/649; 126/644; 126/643
[58] Field of Search ..................................... 126/706, 709, 126/633, 621, 622, 623, 648, 649, 650, 643, 634, 644; 52/506.01, 506.06, 408

[56] References Cited

U.S. PATENT DOCUMENTS

| | | | |
|---|---|---|---|
| 4,334,524 | 6/1982 | McCullough et al. | 126/449 |
| 4,375,216 | 3/1983 | Gessford | 126/648 |
| 4,393,861 | 7/1983 | Beard et al. | 126/633 |
| 4,899,728 | 2/1990 | Peter et al. | 126/428 |
| 5,497,762 | 3/1996 | Rylewski | 126/348 |

FOREIGN PATENT DOCUMENTS

| | | |
|---|---|---|
| 0138574 | 4/1985 | European Pat. Off. . |
| 2327500 | 5/1977 | France . |
| 2353026 | 12/1977 | France . |
| 2410794 | 6/1979 | France . |
| 2534006 | 4/1984 | France . |
| 2653528 | 4/1991 | France . |
| 3931594 | 4/1991 | Germany . |
| 4206480 | 9/1993 | Germany . |
| 678203 | 8/1991 | Switzerland . |

OTHER PUBLICATIONS

WO 87/00607, Lohmeyer, Jan. 1987.
"European Solar Prize for Austria" dated Nov. 4, 1995, to Ökopauk Plesching for; "Niedrigenergiehaus mit transparenter Wärmedämmung" by "Eurosolar Austria".
"Ecodesign 1994" dated Apr. 1995.
"Technologishes Gewerbemuseum, Höhere Technische Bundeslehre–und Versuchsanstalt Wien XX, Physikalisch–technische Versuchsanstalt für Wärme—und Schalltechnik" of Apr. 6, 1995.
"Oberösterreichische Landesregierung", Linz, Nov. 7, 1994.
"Fraunhoter Institut Solar Energiesyteme", Report T0S3–WJP–9602–E03 with accompanying letter dated Mar. 20, 1996.
Solar Energy, vol. 32 (1984) No. 3, Oxford, G. Britian, pp. 349–356, Lee Jong Ho, "Theoretical Study of Honeycomb Structure Collector for Space Heating".

*Primary Examiner*—Carl D. Price
*Attorney, Agent, or Firm*—Horst M. Kasper

[57] ABSTRACT

A combined thermal-insulation/thermal-collector assembly for the outside walls or roofs of buildings has a heat-insulating layer which is transparent to solar radiation and is designed with a transparent structure. The heat-insulating material including a multiplicity of adjacent channels is disposed in essentially the same direction as the flow of heat. The heat-insulating layer is made up of elements which are thin relative to the thickness of the layer. The channels running across the heat-insulating layer are open, have an essentially uniform diameter, and thus form a transparent structure.

25 Claims, 5 Drawing Sheets

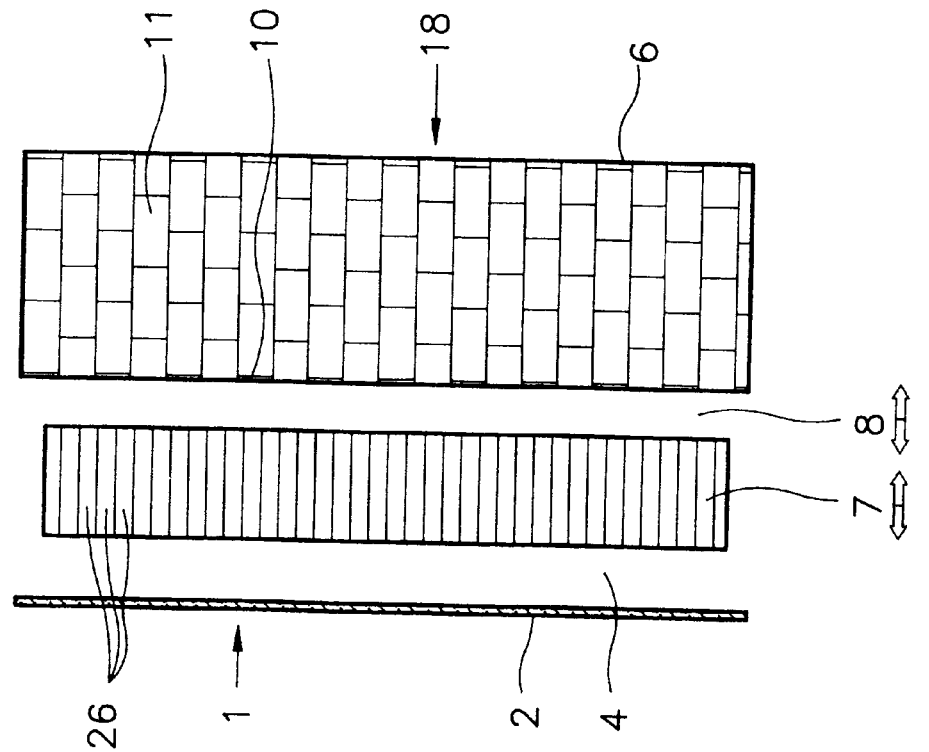
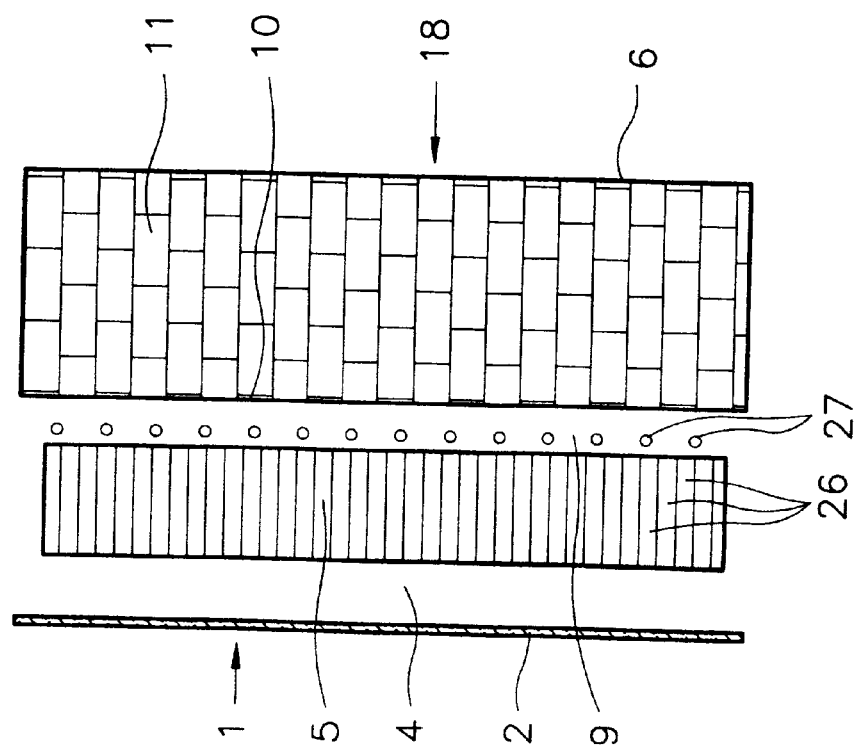

THERMAL INSULATION/THERMAL COLLECTOR ASSEMBLY

CROSS-REFERENCE TO RELATED APPLICATIONS

This application is a continuation-in-part application of another international application filed under the Patent Cooperation Treaty on Jan. 27, 1995, bearing Application No. PCT/EP95/00295, and listing the United States as a designated and/or elected country. The entire disclosure of this latter application, including the drawings thereof, is hereby incorporated in this application as if fully set forth herein.

BACKGROUND OF THE INVENTION

1. Field of the Invention

The present invention relates to an integrated thermal insulation arrangement for buildings, in particular for the outer walls of roofs of buildings, with at least one solar-energy transparent thermally insulating layer, which is constructed as a structurally transparent insulating layer, and which comprises an insulating material including a plurality of side-by-side disposed channels, at least nearly parallel-directed to the thermal stream.

2. Brief Description of the Background of the Invention Including Prior Art

Such thermal insulation arrangements are known already, where plates of thermal-insulation material are applied to the sunny side walls of buildings, where said plates exhibit a plurality of cross-running channels, where the channels expand toward the outside and exhibit a closure which is permeable for sun irradiation, and which close at the interior side with a covering which passes the sun irradiation or which is heat-conducting and light-absorbing.

Channels of this kind have to exhibit a sufficient width in order for the irradiated solar energy to pass up to the interior side of the thermally insulating layer. In addition, a thermal-conducting internal closure of the channels also effects an increase of the thermal conduction toward the outside, which is rarely desirable in moderate climates, because the thermal losses toward the outside are thereby increased in cold weather.

It has also become known to connect heat-exchanger tubes with absorber plates at the outside of such a described thermally insulating layer in order to collect and to discharge solar energy prior to the reaching of the wall of the building.

Several of these structured thermally insulating layers, which are furnished with channels, exhibit a very expensive construction and are frequently furnished in addition with reflecting metal coatings at the inner side of openings or channels of the thermally insulating layer for the better transfer of solar energy and are to transfer in a collective way the energy to a small area.

In the publication SOLAR ENERGY, Volume 32, No. 3, 1984 Oxford, pages 349–356, a structurally transparent layer is described as a thermal collector for a wall, where said layer is made of honeycomb-structured concrete and is disposed in front of a building wall, wherein a slot is present between the building wall and said layer. The channels formed in the structure and of uniform thickness are pulled down slightly obliquely toward the outside in order to allow a better flow behavior for the air flowing through, where the air, heated between the thermal collector and the building wall, rises through the slot upwardly. A protective glass plate is disposed at a distance in front of the outer side of the heat collector.

Aluminum, in particular black-covered aluminum, can be employed as structure material instead of concrete, wherein the aluminum is provided with channels having a square cross-section for simplification of the production.

The application of the recited materials is important for the radiation collection and absorption and for the thermal output to the flowing-through air. An insulating effect against the discharge of heat out of the building wall is not provided; rather, the air and heat in the collector, are employed for spatial heating.

The French printed patent document FR 2,327,500 refers to a thermally insulating layer for a solar collector, where said layer is constructed to have a structure of honeycombs, where said structure allows the solar radiation to penetrate up to the base of the cells and thus up to the surface of the solar collector.

Reference is made in the discussion of the literature to the necessity of the suitable construction of the cells for the reduction of the thermal conduction through the wall of the comb cells and to the use of specially treated paper for the production of the comb cells for the production of the honeycomb structure, as well as to the use of paper with aluminum coating for the production of combs.

On the one hand, sheets of organic polymers and, on the other hand, also layers of fine, sun-permeable, and adhesively attached fibers, in particular of glass, are proposed as construction material.

It is disadvantageous with the conventional forms of construction that they exhibit a complex and expensive construction based on a treatment of the reduced or missing capillary conduction for the humidity.

SUMMARY OF THE INVENTION

1. Purposes of the Invention

It is an object of the present invention to improve an integrated thermally insulating arrangement of the kind initially recited such that it can be produced economically and such that an effective, durable thermally insulating arrangement is produced, which results in high collections of solar energy and low thermal losses at times of low outside temperatures while, at times of high outside temperatures, the acceptance of solar radiation energy is decreased.

These and other objects and advantages of the present invention will become evident from the description which follows.

2. Brief Description of the Invention

The application of a particularly simple construction of the thermally insulating layer of thin elements allows the formation of simply produced open channels, having throughout a uniform internal diameter, which are well suited in like manner for the transfer of the radiation, the diffusion of humidity, and for the obtaining of a high mechanical strength under low use of material.

In this context, the use of particularly structured and, in particular, of wavy sheets of thermally insulating material, and preferably with the intermediate positioning of planar sheets of the same material are simple to process and result in a well-stiffened structure of the thermally insulating layer with channels of uniform diameter and a small diameter in comparison to the thickness of the thermally insulating layer, and this allows an economically favorable mass production using materials available at economically favorable conditions.

The thin elements forming the individual layers in the corrugated cardboard are in each case disposed at a layer distance from each other of from 1 to 20 mm, and preferably of from 3 to 10 mm.

The thickness of the sheets should amount to 0.1 mm–2 mm. The diameter, which in fact is designated as "lumen" because of the non-circular cross-section of the channels, amounts to 1 mm to 20 mm. The ratio of the thickness of the sheets to the diameter of the channel width is not to be larger than 1:10. The layer thickness or depth of the thermally insulating layer is from 30 to 300 mm and is dependent on the size of the channel width, i.e. if the channel width is from 3 mm to 8 mm, the thickness of the thermally insulating layer is to amount to from 30 mm to 80 mm. The ratio "lumen" to thermally insulating layer can be from about 1:3 to 1:100, and is usually between 1:10 and 1:20. In this context, the use of a corrugated cardboard-honeycomb material, such as it is used in the carpentry business for the filling of various hollow space, is particularly advantageous, both with respect to the physical properties as well as with respect to the production. This material exhibits a wall thickness of 0.1 mm to 2 mm, a layer distance between 0.1 mm and 20 mm, and preferably from about 0.1 mm to 2 mm, and the formed channels have a diameter (lumen) of from 1 mm to 40 mm.

With respect to the structurally transparent thermally insulating layer to be protected, there results a thickness dimension of the formed channels of from about 1 mm to 20 mm, wherein the length of the channels surpasses substantially the diameter of the channels by a ratio of from about 1:3 and 1:100, such that in case of a high position of the sun of from 5° to 10° against the irradiation of solar energy penetrates less deep into the thermally insulating layer, i.e. up to at the most 10 to 20 mm from the outermost end, in case of a channel width of the channels of from about 1 mm to 6 mm, and thereby reduces the absorption of the solar energy by the wall of the building, whereas in case of a lower position of the sun at an angle of less than 5°, the irradiation depth of the solar energy is increased up to about 30 mm in case of a channel width of from about 1 mm to 6 mm, and in case of a channel width of 50 mm an irradiation depth of 50 mm etc. results and thereby more heat is transferred to the wall of the building.

The angle of incidence of the sun light of 5° relative to the horizontal position of the channels results only in about 1% of direct irradiation at the inner end of the channels, i.e. at the wall of the masonry.

The radiation, reaching the inner side of the channels and thus the outside of the wall, amounts to from about 12% to 13% in case of a channel width of 4 mm and a layer thickness of 80 mm and a thickness of the cardboard sheet of 0.2 mm and an angle of incidence larger than 5°.

In case of an angle of incidence of from about 5° to 10°, a channel width up to 4 mm, 90% of the irradiation, measured by temperature increase in the region between 10 mm and 20 mm from the outer end of the channels, are absorbed toward the inside; in case of an angle of incidence of 2.5°, this absorption region is increased up to 30 mm toward the inside.

In case of a channel width of 10 mm, there results an absorption region of up to about 50 mm, and in case of a channel width of 20 mm, an absorption region of up to about 100 mm.

Upon use of a transparent covering, for example with granulated or corned glass, the region of the absorption is shifted into the direction of the outer end of the channels based on the scattering at the covering.

In case of a transparent covering of the thermally insulating layer, the rear ventilation can amount to between 0 mm in case of diffusion-open covering and 10 mm to 100 mm in case of a closed covering. The same holds for the rear ventilation slot between the masonry and the thermally insulating layer.

An angle of inclination of from 5° to 10° is employed in case the channels of the thermally insulating layer are running in an inclined downward direction such that, in case of an angle of incidence of the sun radiation of from about 5° to 10°, having an average width and irradiating only in the region of the front walls facing East and West, the penetration depth of the sun radiation is limited to a few millimeters at the outer end of the channels.

In building walls, facing West or facing East, or walls, which are heavily subjected to the weather elements, the use of a structurally transparent thermally insulating layer with channels directed outwardly at an inclined angle of from about 5° to 10° towards the bottom is more favorable because, on the one hand, the penetration of humidity into the channels is decreased and, on the other hand, the irradiation depth of solar energy is decreased or even limited to the outer ends of the channels even in case of a low position of the sun based on the self-opacity of the channels.

The application of a fibrous cellulose material for the construction of the thermally insulating layer allows the inking and the furnishing with fire-retarding materials with economically favorable means being available by way of the spray method or of an immersion method, which are advantageously already employed during production. At the same time, the mechanical stiffness of the structurally transparent thermally insulating layer can be additionally increased by employing suitable finishing materials.

The transfer of the irradiated solar energy into the interior of the thermally insulating layer by the radiation itself as well as by the thermal conduction of the converted radiation energy becomes possible into the material of the thermally insulating layer based on the construction of the structurally transparent thermally insulating layer to be protected.

A reflecting equipment of the thermally insulating layer in the channels increases thereby the penetration depth of the radiation energy into the thermally insulating layer and thereby improves the thermal feeding-in or decreases at least the thermal loss toward the outside substantially.

At the same time, the discharge of humidity is made possible through the capillary conductors and through diffusion in the air layer of the rear ventilation of the transparent covering of the integrated thermally insulating arrangement, or is even further improved by porous covering plates or covering plates furnished with boreholes of a diffusion-open transparent covering based on an arrangement, where the structurally transparent thermally insulating layer is resting solidly at the outer wall of the walling of a building.

Based on the increased temperature, reachable in this integrated thermally insulating arrangement, in the region of the outer wall of the walling and of the masonry, the capillaries of the outer wall of the walling or of the masonry become dried out in the course of time and the drawing-in of humidity from the ground is blocked, such that this integrated thermally insulating arrangement can also be employed as an effective means for the drying of humid masonry.

Depending on the requirements of the thermal transfer or of the preferred removal of humidity from the masonry, the construction of the integrated thermally insulating arrangement can be modified correspondingly.

In case where good thermal conduction between the covering and the outer wall of the walling of a building is most important, air slots between the wall elements are avoided.

In case the cooling of the outer wall of the walling is most important, a heat-exchanger layer is provided between the structurally transparent thermally insulating layer and the outer wall of the walling, wherein the heat-exchanger layer is provided with heat-exchanger tubes or air channels, where the heat can be discharged through the heat-exchanger tubes or air channels by means of a liquid heat-exchanger agent, for example water, or by means of air.

According to this construction it is possible to accelerate the thermal transport into the interior of a building. This is particularly advantageously achieved when an interior-disposed heat-exchanger layer forms the interior delimiting wall of the interior wall of the walling, wherein heat-exchanger tubes for a liquid heat-exchanger agent or air channels are incorporated into the heat-exchanger layers. The interior wall of the walling with the heat-exchanger tubes or the air channels of the interior-disposed heat-exchanger layer are connected to the heat-exchanger tubes or the air channels of the heat-exchanger layer at the outer wall of the walling to form a circulation, where the thermal transport can also occur in reverse in said circulation from the inside toward the outside.

An acceleration of the transfer of the irradiated solar energy becomes very effective in case of a thermal transfer with convection if air flows through the complete integrated thermally insulating arrangement, where the air is led from the rear ventilation of the covering through the channels of the structurally transparent thermally insulating layer and through channels or stones of the masonry into the interior-disposed air channels at the interior wall of the walling or, in case of a lack of the air channel, flows out immediately at the interior wall of the walling.

According to this construction, horizontally disposed, vertically perforated bricks can be employed as economically favorable wall elements, wherein the large surface of the channels in the structurally transparent thermally insulating layer and in the stones of the masonry are available as a heat-exchanger surface.

The mechanical attachment of the structurally transparent thermally insulating layer between a lath for structural work, where the transparent covering is applied to the outer side of said lath, and where the inner side of said lath is attached to the outer wall of the walling of the building, results in an integrated thermally insulating and thermal-collection arrangement which is constructed out of simple elements and is easy to produce.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 3 is a sectional view of an integrated thermally insulating arrangement according to FIG. 1, where a heat-exchanger layer is inserted between the masonry and the structurally transparent thermally insulating layer;

FIG. 4 is a sectional view of an integrated thermally insulating arrangement according to FIG. 3, wherein the heat-exchanger layer is replaced by a variable rear ventilation slot, and wherein the structurally transparent thermally insulating layer is disposed shiftable back and forth between the transparent covering on the outside and the masonry on the inside;

DESCRIPTION OF INVENTION AND PREFERRED EMBODIMENT

Figure 2:
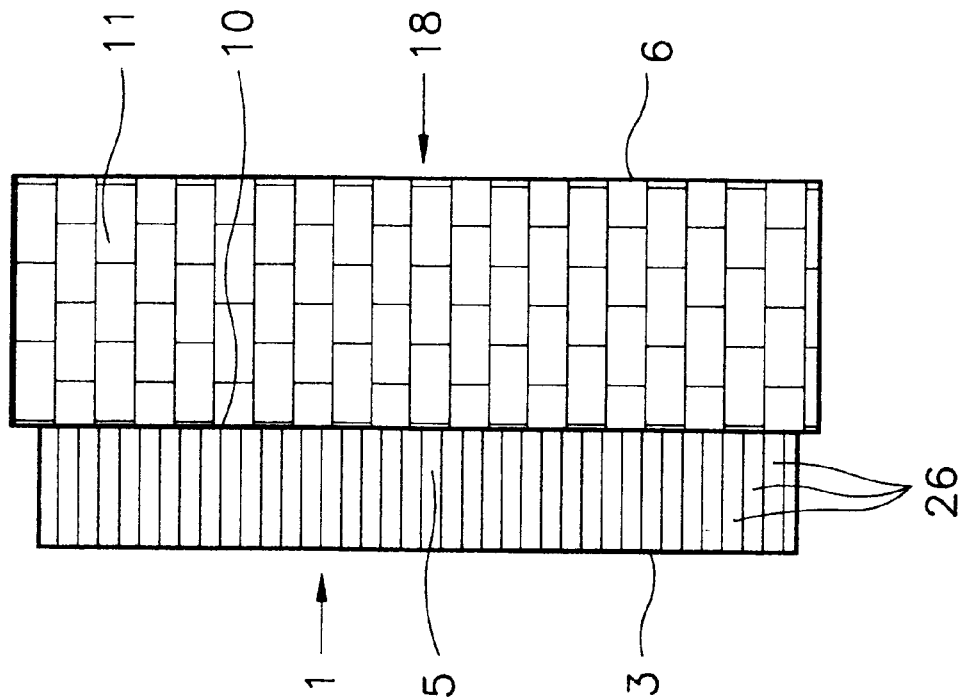
FIG. 2 is a sectional view of an integrated thermally insulating arrangement with transparent, diffusion-open covering immediately on the structurally transparent thermally insulating layer.

According to the present invention, there is provided for an integrated thermally insulating arrangement, in particular for the outer walls or roofs of buildings, with a thermally insulating layer transparent to thermal and/or light irradiation. Said layer is constructed as a structurally transparent insulating layer 5. The thermally insulating layer comprises a plurality of side-by-side disposed open channels 26. The channels 26 are open on two sides and are directed in a direction of a thermal stream. The open channels 26 run through the thermally insulating layer. The channels 26 are thin relative to a layer thickness of the thermally insulating layer. The channels exhibit a substantially throughout uniform diameter of from 1 mm to 20 mm. The thermally insulating layer is produced of an insulating material. The insulating material is made of fibers of a cellulose material. The structurally transparent insulating layer 5, made of an insulating material of fibers of a cellulose material with a portion of cardboard fibers, is formed of sheets. The sheets are made of elements which are thin as compared to a layer thickness of the structurally transparent insulating layer 5. The structurally transparent insulating layer 5 is formed of individual layers. The channels 26, running through the thermally insulating layer, are left open in the individual layers. The channels 26 form with the thermally insulating layer the structurally transparent insulating layer 5. A capillary conduction of humidity from a direction of an outer wall 10 of a walling in the sheets forming a wall of the channels 26 and a discharge by way of diffusion in the sheets is maintained in the structurally transparent insulating layer 5 and is determined by properties of the fibers.

The structurally transparent insulating layer 5, formed of fibers, substantially of cellulose material of the insulating material, can be formed of sheets, of which each sheet in each case can form a layer, and which layer can be generated between the sheets. Said sheets can form delimitations of this layer, and said sheets can be wave-shaped and run back and forth. The channels 26, running through the thermally insulating layer, can be left open in said layer. The individual layers can be adhesively attached to each other.

Planar sheets can be adhesively attached between the back-and-forth running, wave-shaped sheets of the structurally transparent insulating layer 5.

The channels 26, formed in the structurally transparent insulating layer 5, can exhibit a lumen of from about 1 mm to 20 mm which is small in relation to the thickness of the insulating layer 5 of from about 30 mm to 300 mm and which results in a ratio of from about 1:3 to 1:100.

The structurally transparent insulating layer 5 can be produced of wave-shaped corrugated cardboard. A spatial structure of a commercially available "corrugated cardboard-honeycomb," can be present such as it is employed for filling closed hollow spaces at doors or intermediate walls or walls of furniture.

The structurally transparent insulating layer 5 can be produced of corrugated cardboard, in particular of a "corrugated cardboard honeycomb." The structurally transparent insulating layer 5 can be soaked in an immersion method for inking with color pigments and/or for fire-retardation with fire-retarding chemicals, in particular with water glass, boron salt solutions, and/or can be sprayed with biocidic agents.

The channels, disposed in the structurally transparent insulating layer 5, can be disposed at least slightly inclined at an angle of from 5° to 10° relative to a surface of the insulating layer 5 and can be directed running outwardly toward an outer side 1 and downwardly at said angle upon placement at a wall of a building, in particular at the vertical outer wall 10 of the walling.

The structurally transparent insulating layer 5 can transfer thermal energy both through sheets formed by the channels 26, through thermal conduction and capillary conduction and diffusion of humidity as well as by way of radiation in the channels between an interior side, in particular of the outer wall 10 of the walling, and an outer side 1, and vice versa.

The structurally transparent insulating layer 5 can be furnished on an outer side 1 with a transparent covering 2, which leaves open a rear ventilation 4 toward the structurally transparent insulating layer 5.

The structurally transparent insulating layer 5 can be applied sealingly toward an inside, in particular at the outer wall 10 of the walling, and sealingly toward an outside, at the transparent covering 2.

A heat-exchanger layer 9 can be disposed between the structurally transparent insulating layer 5 toward an inside, in particular of the outer wall 10 of the walling. The heat-exchanger layer 9 can be furnished with heat exchanger tubes or air channels 27.

The structurally transparent insulating layer 5 can be shiftably applied between the transparent cover 2 toward an outer side in the rear ventilation 4 and, toward the inside, in particular toward the outer wall 10 of the walling, in a variable rear ventilation slot 8.

The transparent covering 2 can be formed of plates. The plates can be furnished outside with an uneven surface structure at the outer side 1 of the integrated thermally insulating arrangement. The uneven surface structure of the plates is based on the form of a glass having a granulated and corned outer surface, employed for avoiding an outer reflecting effect.

The structurally transparent insulating layer 5 can be furnished with a diffusion-open transparent covering 3. The transparent covering 3 can comprise a water-repellent material furnished with pores.

The structurally transparent insulating layer 5 can adjoin in an open way to the outer wall 10 of the walling of a masonry 12 made of stones with holes 30 passing through the stones, made of wall-open, horizontally placed, vertically perforated bricks. An interior delimiting wall 15, forming an interior disposed air channel 14, can be disposed, preferably at a distance, at an interior wall 6 of the walling of the masonry 12. The air channel 14 can be formed in particular of side-by-side disposed, vertically running partial channels.

A masonry 13 can be composed of stones. Horizontally placed holes 31 of the stones at the outer wall 10 of the walling can exhibit a larger diameter as compared to an interior wall 6 of the walling.

An interior disposed heat-exchanger layer 17 can be arranged at an interior wall 6 of the walling. Heat exchanger tubes or air channels 32 can be incorporated in the heat-exchanger layer 17. The heat exchanger tubes or air channels 32 can be connected to the heat-exchanger tubes or air channels 27 of the heat-exchanger layer 9 at the outer wall 10 of the walling to form a circulation.

The structurally transparent insulating layer 5 can be disposed between a vertically disposed counter lath system 21, which can be attached at the outer wall 10 of the walling. The counter lath system 21 can be furnished with horizontal attachment profiles and attachment hook supports 20. Attachment profiles 23 for the transparent covering 2 or the diffusion-open covering 3 are supported by the counter lath system 21. The transparent covering 2 or the diffusion-open covering 3 can comprise plates. Said plates can be disposed in rows and staggered relative to each other.

The structurally transparent insulating layer 5 can be disposed between a horizontally disposed cross lath system 22, which is attached at the outer wall 10 of the walling. The cross lath system 22 can be furnished with a vertical support lath 24. Attachment hooks 25 for the transparent covering 2 or the diffusion-open covering 3 can be supported by the vertical support lath 24. The transparent covering 2 or the diffusion-open covering 3 can comprise plates. Said plates can be disposed in rows and staggered relative to each other.

Figure 1:
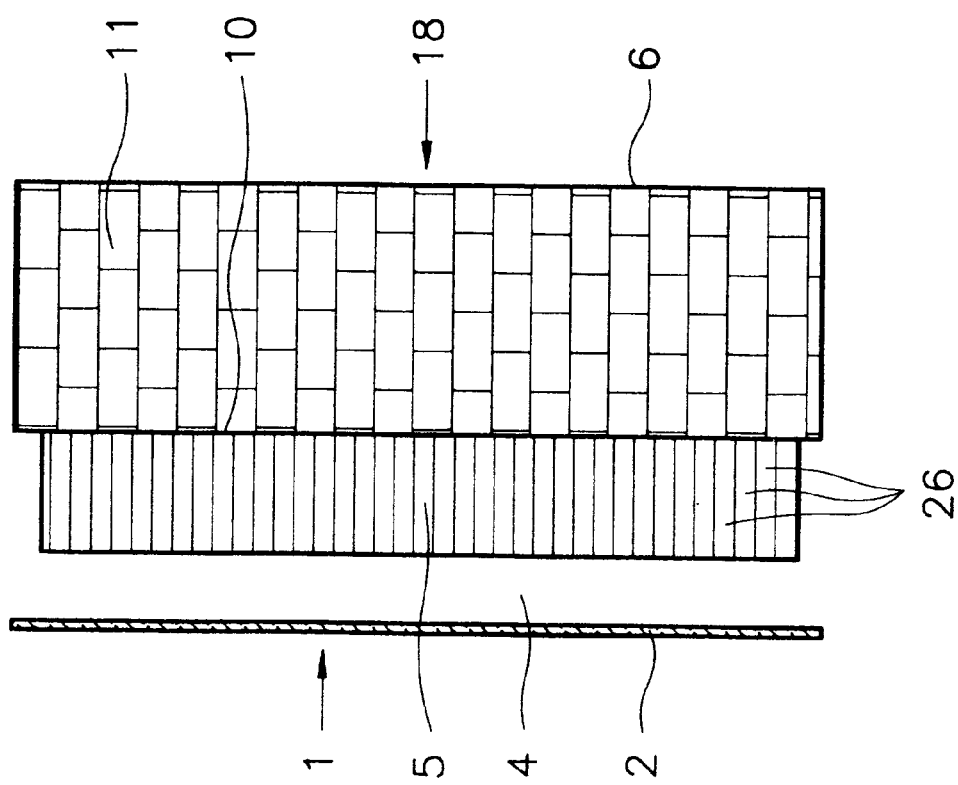
FIG. 1 is a sectional view of an integrated thermally insulating and thermal-collection arrangement with a structurally transparent thermally insulating layer, attached closely resting at a masonry, where the thermally insulating layer is furnished on the outside with a transparent covering with a rear ventilation.

An integrated thermally insulating and thermal collection arrangement is illustrated in FIG. 1, where a masonry 11 represents an interior part of a wall of a building, where the interior side 18 of the building wall is formed by the interior wall 6 of the walling, and wherein the structurally thermally insulating layer 5 is resting closely and without any spacing at the outer wall 10 of the walling of the masonry 11. This structurally transparent thermally insulating layer 5 comprises thin, wavy sheets of thermally insulating material, such as cardboard fibers, which are adhesively attached with planar intermediate sheets and form channels 26 running over the depth of the thermally insulating layer 5, wherein the channels 26 are indicated in the illustration. This structurally transparent thermally insulating layer 5 allows solar-energy radiation, which runs in the direction of the channels 26, to penetrate the depth of the channels 26, while the self-opacity of the thermally insulating layer 5 rises very quickly based on an increasing angle of the solar energy rays relative to the direction of the channels 26 and, depending on the diameter or, respectively, the lumen of the channels, the irradiation angle is from about 5° to 10° relative to a horizontal plane in case of horizontal channels having a depth of up to about 20 mm.

The thermally insulating layer has to be permeable only for specific radiation types, namely in the present invention thermal radiation and light radiation. This type of thermally insulating layer is well known in the art.

Structurally-transparent insulating layers are known in the art and have been disclosed, for example, in the article "Theoretical Study of Honeycomb Structure, Collector for Space Heating in 2382 Solar Energy, Volume 32 (1984) No. 3, Oxford, Great Britain, European printed patent document No. EP 0,138,574-A3, French printed patent document No. 2,327,500, Swiss printed patent document No. CH 678,203-A5, German printed patent document No. DE 3,931,594-A1. Based on the conversion of the solar-energy radiation into heat which, depending on the angle of irradiation, occurs in different regions in the interior of the channels, the thermal flow of the building wall is decreased or even blocked or even reversed in case of low outside temperatures.

The differentiation whether it is a structurally-transparent insulating material or not can be determined by a person skilled in the art, at least with the aid of a test laboratory.

The wave-shaped sheets have a wall thickness of from about 1 mm to 2 mm and the distance between the layers of said sheets amounts to from about 1 mm and 20 mm.

This structurally transparent thermally insulating layer 5 is closed toward the outer side 1 by a transparent covering 2 and is separated from the transparent covering 2 by a rear ventilation 4 in the form of an air slot having a diameter from 10 mm to 100 mm, where an air stream can be led through the air slot for the cooling of the thermally insulating arrangement.

The channels 26 of the structurally transparent thermally insulating layer 5 exhibit a small diameter or lumen in comparison to the depth of the thermally insulating layer 5, wherein the channel width is from about 1 mm to 20 mm, and wherein the depth is from about 30 mm to 300 mm, corresponding to a ratio of from 1:3 to 1:100 of diameter to depth of the thermally insulating layer, such that the irradiated solar energy, in case of an average position of the sun of more than 5° to 10°, is already absorbed in the outer surface region having a thickness of 10 mm to 20 mm in case of a channel width of 1 mm to 6 mm of the structurally transparent insulating layer 5, from where the thermal transport by thermal conduction is then performed through the thermally insulating layer.

In case of a low position of the sun of less than 5°, a larger portion of the irradiated solar energy thereby reaches deeper into the structurally transparent thermally insulating layer 5 before it is absorbed and, in the most favorable case, up to the outer wall 10 of the walling.

In case of an undesirably high thermal irradiation, as it can occur at the West side and at the East side of buildings, the channels 26 of the structurally transparent thermally insulating layer are produced running downwardly inclined at an angle of 5° to 10° (not illustrated), whereby the self-opacity relative to the irradiated solar energy is substantially increased.

Side-by-side disposed channels are disclosed by the same state of the art as for the structurally-transparent insulating layers, where the channels are equidirectional, i.e. the channels are disposed horizontally in case of a vertical wall.

The ratio of the thickness of the insulating layers relative to the diameter of the channels is from 1:3 to 1:100. The channels exhibit a throughout uniform diameter, i.e. the channels exhibit no expansions or reductions in their diameter. Channels with differing diameters are also known in the state of the art in connection with these insulating layers.

The insulating layers can be produced of fibers made of cellulose material, which are defined in the general state of the art. Likewise, sheets made of fiber material, consisting of cellulose material, are clearly available and are known to the person skilled in the paper and cardboard manufacturing field.

Fibers of cellulose material can be fibers of pulp cellulose, however, fibers of cellulose material can also be fibers of mechanically disintegrated wood pulp or arbitrary mixtures of different raw materials of the paper and pulp manufacture and are also defined by the general state of the art. The claimed capillary conduction of the humidity belongs to the properties of the materials for the paper and pulp manufacture and to the fleece sheets produced therewith. The physical properties, sought to be protected in the present case, are for a completely new field of application, and the effect of the physical properties on the thermal insulating can be determined already by means of indirect measurements.

The channels can be left free in a paper mass, built up by layers, or the channels can be generated based on the design and structure of the superposed sheets. The structure of the insulating layer, determining the physical properties, is achieved based on the channels which are open on both sides, whereas the form of the channel wall is in this case of less importance. The channel walls can exhibit a honeycomb-shaped cross-section or the cross-section of a corrugated cardboard, or can be square, or round, or of any arbitrary shape.

What is important for the properties of the insulating layer is that the channels are "open" and exhibit a uniform, or at least substantially uniform diameter, without any particular requirements in regard to the production tolerance. The diameter is better designated as a "lumen", since the channels need not be round and, of course, the length of the channels corresponds to the thickness of the thermally insulating layer, since the channels are equidirected to the thermal flow.

The capillary conduction of the humidity has already bee determined by measurements and, in fact, both by the inventor and, in the meantime, by an independent, renowned institute. A quantitative limitation cannot be made based on the property differences occurring in the usable fiber material. However, nothing has become known in the art for such insulating layers relative to the capillary conduction and diffusion of the humidity.

It is be generally known that cellulose material exhibits the described properties. It is also known that specific types of earth material or of mineral construction materials exhibit these properties, such that no discussion is required in this case.

A commercially available corrugated cardboard material can be employed in the present invention. The spatial structure comprises corrugated cardboard having a sheet strength of from 0.1 mm to 2 mm and the diameter or lumen of the channels in the corrugated cardboard can be from 1 mm to 40 mm. Of course, the layers thicknesses of these "carpentry combs" do not necessary coincide with the layer thicknesses, as they are used for the thermal insulation.

According to the integrated thermally insulating and thermal-collection arrangement illustrated in FIG. 2, the structurally thermally insulating layer 5 closes off at the outer side 1 with a diffusion-open transparent covering 3, for example made of water-repellent fiber fleece, such as finished corrugated cardboard, which is disposed sealingly resting.

The structurally transparent thermally insulating layer 5 is soaked with fire-retarding solutions of water glass, boron salt or phosphate and with biocidic agents against fungi and insect infestation and dried.

In order to be able to discharge the solar thermal energy led to the outer wall 10 of the walling in case of excess, a heat-exchanger layer is inserted between the structurally transparent thermally insulating layer 5 and the outer wall 10 of the walling, as illustrated in FIG. 3, where heat-exchanger tubes or air channels 27 are provided in the heat-exchanger layer, wherein the heat-exchanger medium, for example water or air, leads the excessive heat away.

Since the requirements of the thermal insulation change considerably as a function of the outside temperature and the irradiation of solar energy, an embodiment is shown in FIG. 4 of the integrated thermally insulating and thermal-collection arrangement, where a rear ventilation 4 is provided between the transparent covering 2 at the outer side 1 and a spatially variable, structurally transparent thermally insulating layer 7, which corresponds in its structure to the thermally insulating layer 5, and a variable rear ventilation slot 8 is furnished between the structurally transparent thermally insulating layer 7 and the outer wall 10 of the walling. The width of the rear ventilation 4 between the transparent covering 2 and the structurally transparent thermally insulating layer 7 amounts to from about 10 to 100 mm. The rear ventilation slot 8 has a width of from 10 mm to 100 mm.

By shifting the spatially variable, structurally transparent thermally insulating layer 7, either the rear ventilation 4 or the rear ventilation slot 8 can thereby be increased or decreased, depending if the thermal discharge is to occur immediately behind the transparent covering 2 or in front of the outer wall 10 of the walling or, alternatively, at both sites of the wall construction.

The structurally transparent thermally insulating layer 5 can be employed between the counter lath system 21 for structural work, attached to the outer wall 10 of the walling and made of lath disposed vertically, wherein the counter lath system 21 is nailed with horizontal attachment profile supports and attachment hook supports 20, wherein attachment profiles 23 for the plates 28, 28' of the transparent covering 2 are nailed to or, respectively, hung in the horizontal attachment profile supports and attachment hook supports 20, and wherein the plates 28, 28' of the covering 2 are inserted into the attachment profiles 23 and are held at the top and at the bottom.

Figure 6:
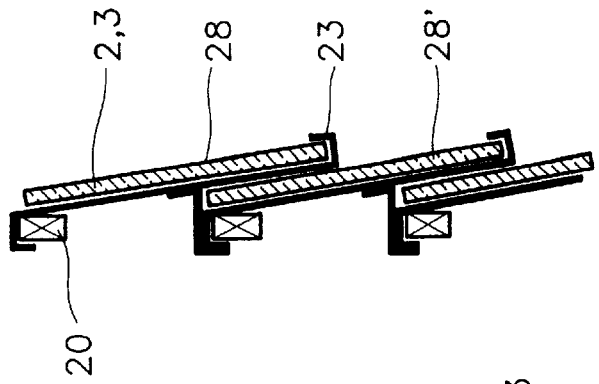
FIG. 6 is a sectional view of an integrated thermally insulating arrangement, along section line 6—6 of FIG. 5.
Figure 7:
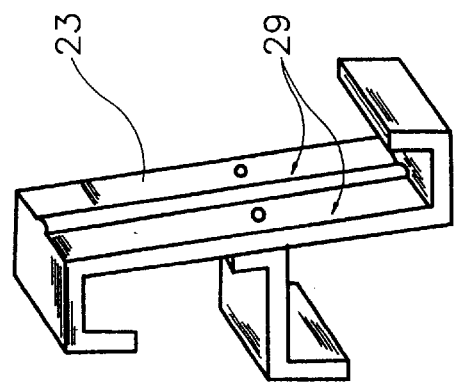
FIG. 7 is an oblique view of an attachment profile for the plates of the transparent covering.
Figure 5:
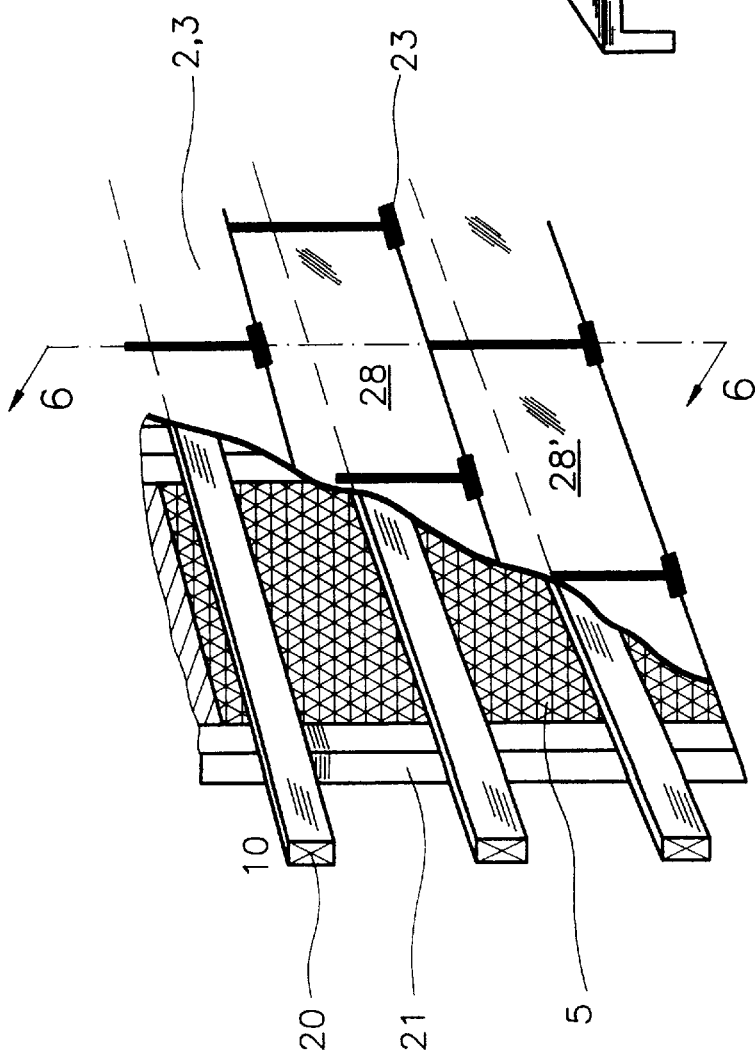
FIG. 5 is an oblique and in part sectional view of an integrated thermally insulating arrangement with a wall lath for structural work with an inserted structurally transparent thermally insulating layer and a transparent covering of plates, which are applied with attachment profiles to the wall lath for structural work staggered in rows relative to each other.

The stacks of plates are thereby layed over the attachment profiles, such that running-off rain water can flow off over the outer side 29 of an attachment profile 23 downwardly onto the next plate 28' (FIGS. 5–7).

Figure 9:
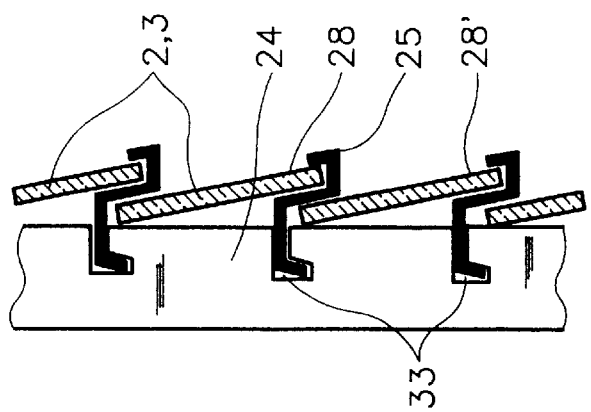
FIG. 9 is a sectional view of an integrated thermally insulating arrangement, along section line 9—9 of FIG. 8.
Figure 10:
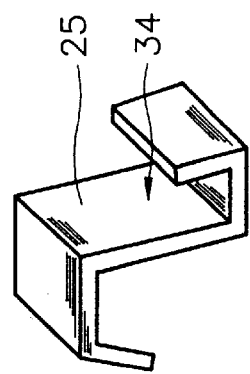
FIG. 10 is an oblique view of an attachment hook for the plates of the transparent covering.
Figure 8:
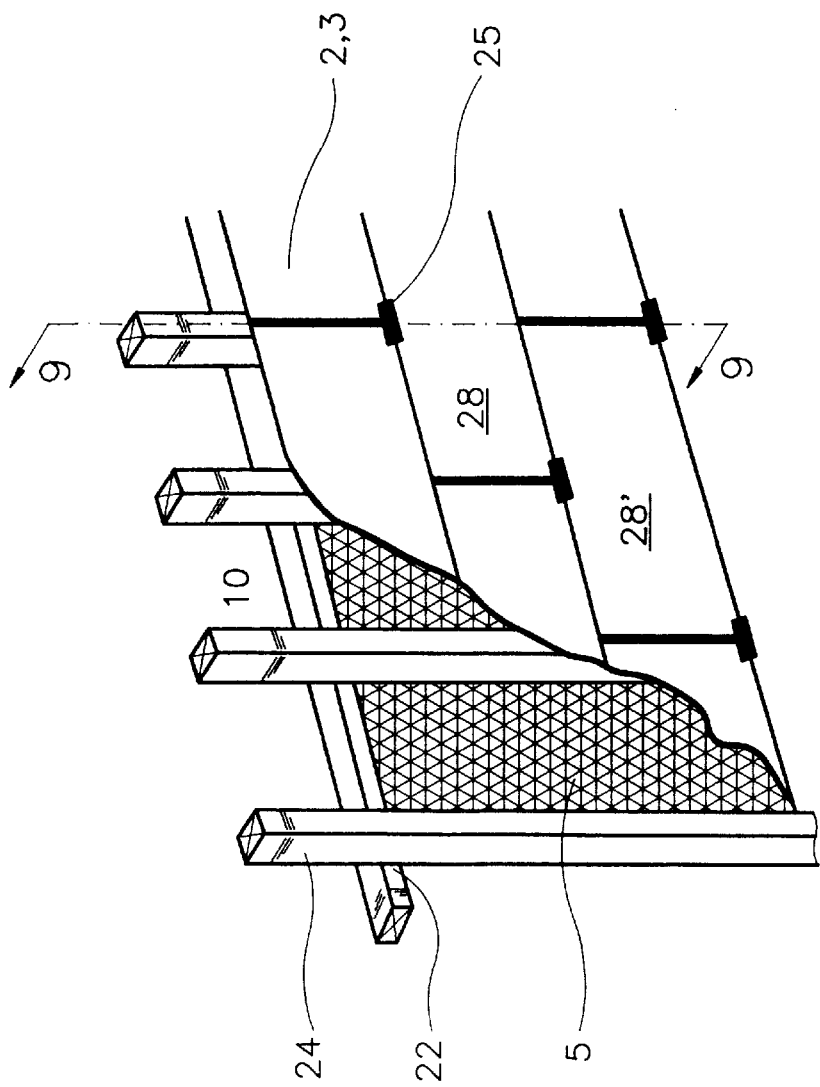
FIG. 8 is an oblique and in part sectional view of an integrated thermally insulating arrangement with a different wall lath for structural work with inserted structurally transparent thermally insulating layer and a transparent covering of plates, which are attached with attachment hooks at the wall lath for structural work staggered in rows relative to each other.

In case of a modified way of attachment, as it is illustrated in FIGS. 7–9, the horizontal cross lath system 22 is attached to and disposed directly at the outer wall 10 of the walling, where the structurally transparent thermally insulating layer 5 is inserted between the lathes of the horizontal cross lath 22.

This cross lath system 22 is furnished with a vertical support lath 24 for the transparent covering 2, wherein mill-outs 33 are incorporated into the vertical support lath 24, into which mill-outs 33 the attachment hooks 25 for the plates 28, 28' of the transparent covering 2 are hooked, wherein these plates are placed into hook parts of the attachment hooks 25, where the hook parts are bent toward the outside and upwardly, while the plates are held at their upper end in a covered way by the hook body.

The stacks of the plates 28, 28' are placed thereby at the front side 34 of the attachment hooks such that rain water, penetrating there, runs off to the next lower row of the plates.

The plates 28, 28' of the covering comprise a glass with granulated and corned outer surface, such as conventional grain glass, in order to avoid reflections in the outer region.

Figure 12:
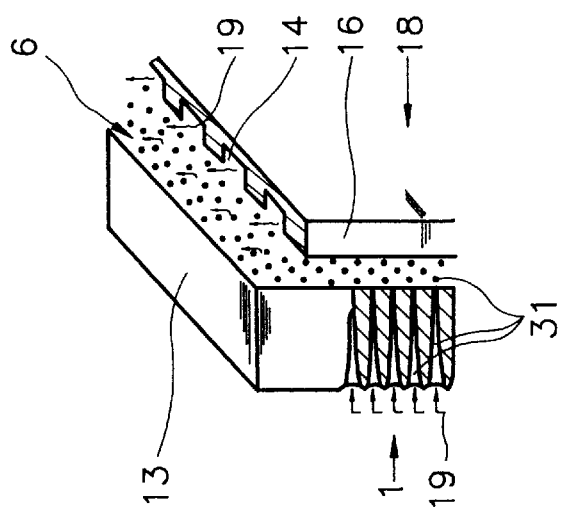
FIG. 12 is an oblique and in part sectional view of the masonry according to FIG. 11, with stones with outwardly expanding channels and with an internal air channel, which is expanded to vertical partial channels and which is incorporated into the interior delimiting wall.
Figure 11:
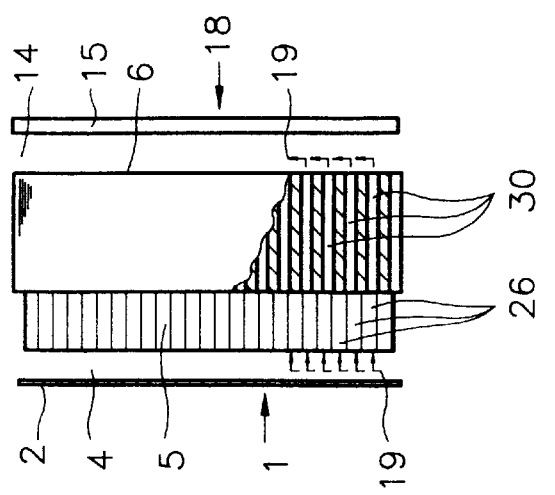
FIG. 11 is a sectional view of an integrated thermally insulating arrangement with a masonry permeated by channels running from the outside to the inside, with a structurally transparent thermally insulating layer closely adjoining to the outside, with a transparent covering with rear ventilation, and toward the inside with an interior-disposed air channel with an interior delimiting wall.

In order to increase the transferred thermal output, the convection of the air can be employed, as is illustrated in FIG. 11 and 12.

An arrangement according to FIG. 1. is the starting point of FIG. 11., wherein the structurally transparent thermally insulating layer 5 is resting solidly at the outer wall 10 of the walling. A masonry 12 is employed made of horizontal, wall-open-placed, vertically perforated bricks, where the holes 30 of the bricks pass through the wall. An interior disposed air channel 14 is generated at the interior wall 6 of the walling by an interior delimiting wall 15, placed in front of and at a distance from the interior wall 6 of the walling.

For heating the building, an air stream 19 from the rear ventilation 4 of the transparent covering 4 can flow through the channels 26 of the structurally transparent thermally insulating layer 5, while simultaneously receiving the irradiated heat, and the air stream 19 passes through the holes 30 of the masonry 12 into the interior-disposed air channel 14, where the air stream 19 streams upwardly into the building.

In a similar way, it is possible to produce the cooling of the building in that an air stream 19 from a cool region of the building, for example, the basement region, is lead through the building wall by way of convection or artificial transport means into the interior of the building.

In order to form the air stream 19 more favorably, a masonry 13, made of horizontal, wall-open-placed vertically perforated bricks, can be employed, where the inner diameter of the holes 31 of the brick increases toward the outer wall 10 of the walling, as illustrated in FIG. 12.

In order to improve the guiding of the stream of the air stream 19 in the interior-disposed air channel 14, the air channel 14 is expanded with vertically running partial channels, which are incorporated into the interior delimiting wall 16.

Figure 13:
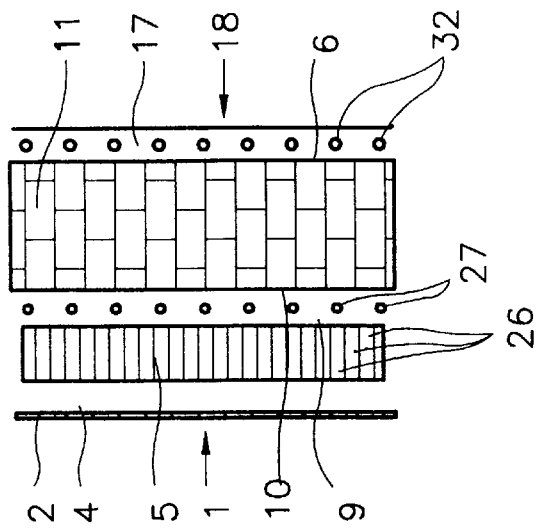
FIG. 13 is a sectional view of an integrated thermally insulating arrangement according to FIG. 3, with an additional interior heat-exchanger layer with heat-exchanger tubes or air channels, which form an interior delimiting wall.

In order to increase the thermal transfer between the outer side 1 and the interior side 18 of a building, according to an arrangement according to FIG. 12, an interior-disposed air channel 14 can be produced by an interior delimiting wall 16, wherein heat-exchanger tubes 32 are disposed on top of each other in the air channel 14, wherein the thermal medium of the heat-exchanger tubes 32 can feed or discharge, and wherein the heat exchanger tubes 32 are connected to the heat-exchanger tubes 27 of the heat-exchanger layer 9 at the outer wall 10 of the walling to form a circulation (FIG. 13).

It makes sense to produce roofs out of this insulating material. However, in this case, a transparent covering has to be included because of the humidity and because the conduction of the humidity has to remain intact, i.e. the corrugated cardboard cannot be reduced with a furnishing with, for example, water-repellent agents.

It will be understood that each of the elements described above, or two or more together, may also find a useful application in other types of thermal insulations differing from the types described above.

While the invention has been illustrated and described as embodied in the context of an integrated thermally insulating arrangement, in particular for the outer walls or roofs of buildings, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. An integrated thermally insulating arrangement for exterior building faces of buildings comprising
    exterior building faces of a building;
    sheets made of insulating material and adhesively attached to one another to form a structurally transparent insulating layer having an inner side and having an outer side;
    channels formed in the structurally transparent insulating layer by attaching the sheets to one another, wherein the channels run through the structurally transparent insulating layer and are left open, and wherein the channels, formed in the structurally transparent insulating layer, exhibit a channel diameter of from about 1 mm to 20 mm and are small in relation to a thickness of about 30 mm to 300 mm between the outer side and the inner side for the structurally transparent insulating layer and which results in a ratio of from about 1:3 to 1:100 for the diameter of the channel to the length of the channel, and wherein the inner side of the structurally transparent insulating layer is attached to an outer side of said exterior building faces of the building.

2. An integrated thermally insulating arrangement for an exterior building face of a building comprising
    a structurally transparent insulating layer (5) having an inner side and having an outer side and formed of sheets made of insulating material and adhesively attached to one other, wherein channels (26) are formed in the structurally transparent insulating layer (5) by attaching the sheets to one other, wherein the channels (26) run through the structurally transparent insulating layer (5) and are left open and wherein the channels (26), formed in the structurally transparent insulating layer (5), exhibit a channel diameter of from about 1 mm to 20 mm and are small in relation to a thickness of about 30 mm to 300 mm between the outer side and the inner side for the structurally transparent insulating layer (5) and which results in a ratio of from about 1:3 to 1:100, and wherein the structurally transparent insulating layer (5) at an inner side is attached to an outer side (10) of said exterior building face of the building.

3. The integrated thermally insulating arrangement according to claim 2, wherein the insulating material of the structurally transparent insulating layer (5) is a wave-shaped corrugated cardboard.

4. The integrated thermally insulating arrangement according to claim 2, wherein the insulating material of the structurally transparent insulating layer (5) is a "corrugated cardboard honeycomb," wherein the structurally transparent insulating layer (5) is soaked in an immersion method for inking with at least one of color pigments and fire-retarding chemicals.

5. The integrated thermally insulating arrangement according to claim 4, wherein the fire-retarding chemical is water glass.

6. The integrated thermally insulating arrangement according to claim 4, wherein the fire-retarding chemicals are boron salt solutions.

7. The integrated thermally insulating arrangement according to claim 4, wherein the fire-retarding chemicals are sprayed with biocidic agents.

8. The integrated thermally insulating arrangement according to claim 2, wherein the structurally transparent insulating layer (5) is disposed between a vertically disposed counter lath system (21) attached to the outer side (10) of the building outer walls, wherein the counter lath system (21) is furnished with horizontal attachment profiles (23) and attachment hook supports (20), wherein the horizontal attachment profiles (23) support a diffusion-open covering (3), and wherein the diffusion-open covering (3) comprise plates, wherein said plates are disposed in rows and staggered relative to each other.

9. The integrated thermally insulating arrangement according to claim 2, wherein the structurally transparent insulating layer (5) is disposed between a horizontally disposed cross lath system (22) attached to the exterior building face (10) of the building, wherein the cross lath system (22) is furnished with a vertical support lath (24), wherein attachment hooks (25) for a diffusion-open covering (3) are supported by the vertical support lath (24), and wherein the diffusion-open covering (3) comprise plates, wherein said plates are disposed in rows and staggered relative to each other.

10. The integrated thermally insulating arrangement according to claim 2, wherein the channels (5), disposed in the structurally transparent insulating layer (5), are disposed at least slightly inclined at an angle of from 5° to 10° relative to a surface of the structurally transparent insulating layer (5) and are directed running outwardly toward outside (1) and downwardly at said angle upon placement at the building walls.

11. The integrated thermally insulating arrangement according to claim 2, wherein the structurally transparent insulating layer (5) transfers thermal energy both through the sheets formed by the channels (26), through thermal conduction and capillary conduction and diffusion of humidity as well as by way of radiation in the channels between an interior side, in particular of the vertical outer wall (10) of the walling, and an outer side (1), and vice versa.

12. The integrated thermally insulating arrangement according to claim 2, wherein the structurally transparent insulating layer (5) is furnished on an layer outer side with a transparent covering (2) disposed at a distance relative to the structurally transparent insulating layer (5) for creating a rear ventilation (4).

13. The integrated thermally insulating arrangement according to claim 12, wherein the structurally transparent insulating layer (5) is shiftably applied between the transparent covering (2) and the outer side (10) in the rear ventilation (4) and thereby a variable rear ventilation slot (8) is created between the structurally transparent insulating layer (5) and the exterior building face (10) of the building.

14. The integrated thermally insulating arrangement according to claim 12, wherein the transparent covering (2) is formed of plates, wherein the plates are furnished with an uneven surface structure on a side adjacent to an open air, wherein the uneven surface structure of the plates is based on a form of a glass having a granulated and corned outer surface, employed for avoiding an outer reflecting effect.

15. The integrated thermally insulating arrangement according to claim 2, wherein the structurally transparent insulating layer (5) at a layer inner side is sealingly attached to the exterior building face and sealingly covered with a transparent covering (2) at a layer outer side.

16. The integrated thermally insulating arrangement according to claim 2, wherein a heat-exchanger layer (9) is disposed between the structurally transparent insulating layer (5) and the outer side (10) of the building outer walls, and wherein the heat-exchanger layer (9) is furnished with at least one of heat exchanger tubes and air channels (27).

17. The integrated thermally insulating arrangement according to claim 16, wherein an interior disposed heat-exchanger layer (17) is arranged at an interior side (6) of an outer wall (11) of the building, wherein second heat exchanger tubes (32) are connected to the heat-exchanger tubes or air channels (27) of the heat-exchanger layer (9) to form a circulation.

18. The integrated thermally insulating arrangement according to claim 2, wherein the structurally transparent insulating layer (5) is furnished with a diffusion-open transparent covering (3), and wherein the diffusion-open transparent covering (3) comprises a water-repellent material furnished with pores.

19. The integrated thermally insulating arrangement according to claim 2, wherein the structurally transparent insulating layer (5) adjoins in an open way to the exterior building face (10) of the building (12) made of stones with holes (30) passing through the stones, made of wall-open, horizontally placed, vertically perforated bricks, wherein an interior delimiting wall (15), forming an interior disposed air channel (14), is disposed at a distance, at an interior side (6) of the building outer walls, wherein the air channel (14) is formed of side-by-side disposed, vertically running partial channels.

20. The integrated thermally insulating arrangement according to claim 2, wherein the exterior building face is a building outer wall (13) composed of stones.

21. The integrated thermally insulating arrangement according to claim 2, wherein the structurally transparent insulating layer (5) is disposed between a vertically disposed counter lath system (21) attached to the exterior building face (10) of the building, wherein the counter lath system (21) is furnished with horizontal attachment profiles (23) and attachment hook supports (20), wherein the horizontal attachment profiles (23) support a transparent covering (2), and wherein the transparent covering (2) comprises plates, wherein said plates are disposed in rows and staggered relative to each other.

22. The integrated thermally insulating arrangement according to claim 2, wherein the structurally transparent insulating layer (5) is disposed between a horizontally disposed cross lath system (22) attached to the exterior building face (10) of the building, wherein the cross lath system (22) is furnished with a vertical support lath (24), wherein attachment hooks (25) for a transparent covering (2) are supported by the vertical support lath (24), and wherein the transparent covering (2) comprises plates, wherein said plates are disposed in rows and staggered relative to each other.

23. The integrated thermally insulating arrangement according to claim 2, wherein the insulating material of the structurally transparent insulating layer (5) is made of fibers of a cellulose material.

24. The integrated thermally insulating arrangement according to claim 2, wherein the structurally transparent insulating layer (5) is made of sheets of fibers of a cellulose material, wherein the thickness of said sheets is very thin as compared to the lumen of the channels (26) and amounts to from one to several tenths of a millimeter, and wherein the fibers of a cellulose material essentially retain their properties.

25. The integrated thermally insulating arrangement according to claim 2, wherein the channels (26) are formed between the sheets made of the fibers of cellulose material and forming the structurally transparent insulating layer (5);

wherein a capillary conduction of humidity from the exterior building face (10) of the building is provided by the fibers of the cellulose material of the sheets and wherein the conduction is performed by diffusion into the sheets and channels (26), and wherein said conductions are determined by properties of the fibers of cellulose material, which properties are essentially maintained.

* * * * *